J. ABLE.
SELF STARTER.
APPLICATION FILED MAY 23, 1918.
1,320,436.
Patented Nov. 4, 1919.
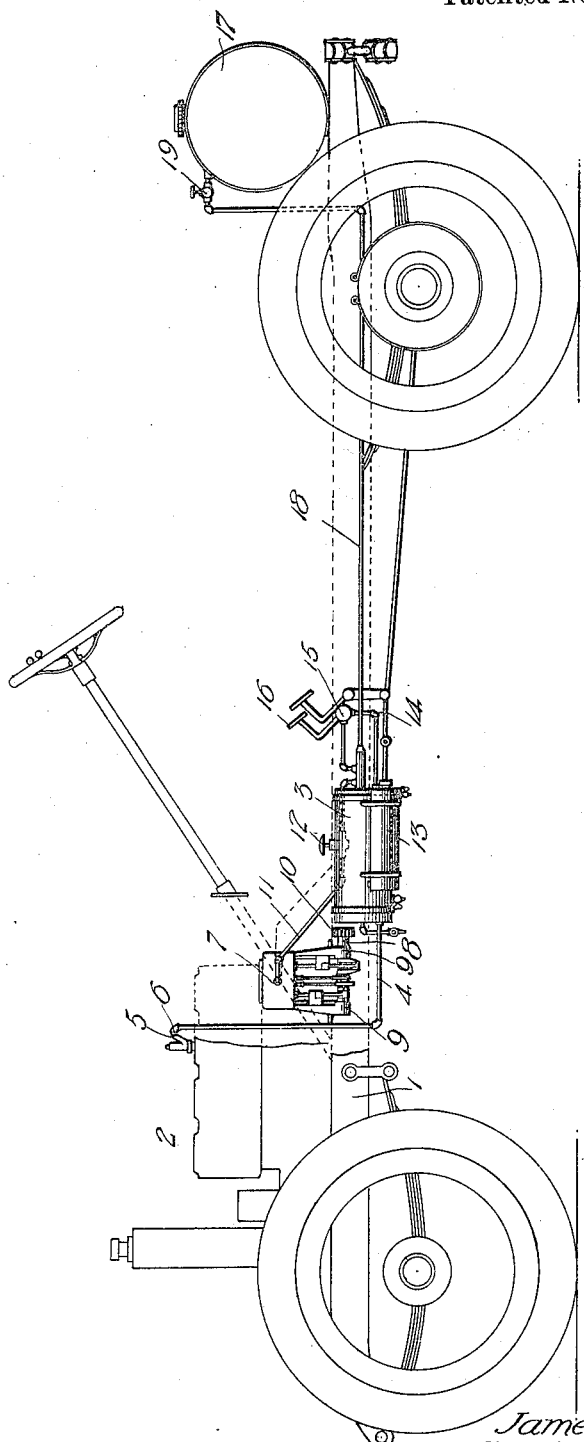
WITNESSES
R. E. Rousseau.
INVENTOR
James Able,
BY
Munn & Co.
ATTORNEYS

UNITED STATES PATENT OFFICE.

JAMES ABLE, OF NASHVILLE, TENNESSEE.

SELF-STARTER.

1,320,436.  Specification of Letters Patent.  Patented Nov. 4, 1919.

Application filed May 23, 1918. Serial No. 236,112.

*To all whom it may concern:*

Be it known that I, JAMES ABLE, a citizen of the United States, and a resident of Nashville, in the county of Davidson and State of Tennessee, have invented certain new and useful Improvements in Self-Starters, of which the following is a specification.

My invention is an improvement in self-starters, and has for its object to provide a device of the character specified for use with motor vehicles, wherein a starter is provided, and a compression tank for receiving compression from the motor, the tank having a valved connection with the starter, to permit it to be connected therewith at will to operate the starter.

In the drawing is shown a side view of a motor vehicle having the improved starter.

The present embodiment of the invention is shown in connection with a motor vehicle 1 of the usual construction, the said vehicle having the usual motor, indicated at 2. A compression tank 3 is provided, and this tank is connected by means of a pipe 4 with the engine, to receive the compression.

The connection with one of the cylinders is made through the priming valve 5 of the cylinder, a check valve, indicated at 6, being interposed in the pipe to prevent the escape of pressure from the compression tank 3.

The starting engine or motor 7, which may be of any approved type, consisting of cylinders having pistons connected with cranks on a shaft 8 which is journaled in bearings 9 in the engine is adapted to be connected with the engine shaft by means of a gear wheel 10 in any usual or desired manner, and this engine is connected to the compression tank 3 by means of a pipe 11. A manually operated valve 12 is interposed in the length of the pipe 11, and by means of the valve the starter engine may be connected with the compression tank to start the engine.

The subject matter of my prior application Serial No. 221,739, filed March 11, 1918, is a brake mechanism, and the said mechanism, whose operating cylinder is indicated at 13, may be connected with the compression tank 3, by means of a pipe 14 having a valve 15 operated by a pedal 16. Thus the compression brake and the starter are both supplied from the same tank.

In operation, during the working of the engine, compression is stored in the tank 3. When it is desired to start the engine, the gear wheel 10 is connected with the engine shaft, and the valve 12 is operated to connect the starting engine with the compression tank. When it is desired to work the brakes, the pedal 16 will connect the cylinder 13 with the compression tank. Thus with a common compression tank supplied with pressure by one of the cylinders of the engine, the motor may be started and the brakes may be controlled. It will be understood that both brake and starter may be operated independently of each other.

Compression may be also supplied to the gasolene tank, indicated at 17, by means of a pipe 18 having interposed therein a valve 19. By opening the valve the pressure from the tank 13 is admitted to the tank or reservoir 17 to put the gasolene in the tank 17 under pressure.

It will be understood that, if desired, the compression may be taken from more than one cylinder, or from as many as may be necessary.

I claim:

In a motor vehicle, the combination with the engine, of a fluid under pressure controlled starting engine having means for connecting the same with the engine shaft when desired, a compression tank, a check controlled connection between the said tank and one of the cylinders of the engine for permitting the compression in the cylinder to be stored in the tank, a connection between the tank and the starting engine, a valve under the control of the driver for controlling the said connection to admit pressure to the starting engine, a brake cylinder, a connection between the said cylinder and the tank for admitting pressure to the cylinder for operating the brake, a manually controlled valve in said connection for controlling the same and valve controlled means for supplying pressure from the compression tank to the fuel tank of the engine.

JAMES ABLE.

Copies of this patent may be obtained for five cents each, by addressing the "Commissioner of Patents, Washington, D. C."